(No Model.)

G. A. BRACHHAUSEN.
DAMPING DEVICE FOR MUSIC BOXES.

No. 500,369. Patented June 27, 1893.

WITNESSES:
Frank S. Ober
Charles E. Smith

INVENTOR
Gustav A. Brachhausen
BY
Briesen & Knauth
his ATTORNEYS.

THE NORRIS PETERS CO., PHOTO-LITHO., WASHINGTON, D. C.

UNITED STATES PATENT OFFICE.

GUSTAV A. BRACHHAUSEN, OF JERSEY CITY, NEW JERSEY.

DAMPING DEVICE FOR MUSIC-BOXES.

SPECIFICATION forming part of Letters Patent No. 500,369, dated June 27, 1893.

Application filed December 1, 1892. Serial No. 453,712. (No model.)

*To all whom it may concern:*

Be it known that I, GUSTAV ADOLF BRACHHAUSEN, residing at Jersey City, Hudson county, in the State of New Jersey, have invented a new and Improved Damping Device for Music-Boxes, of which the following is a full, clear, and exact description, reference being had to the accompanying drawings, in which—

Figure 1:
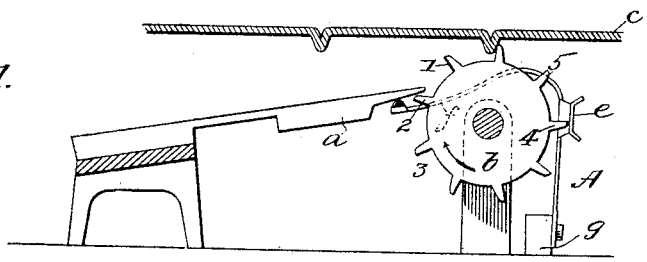
Figure 2:
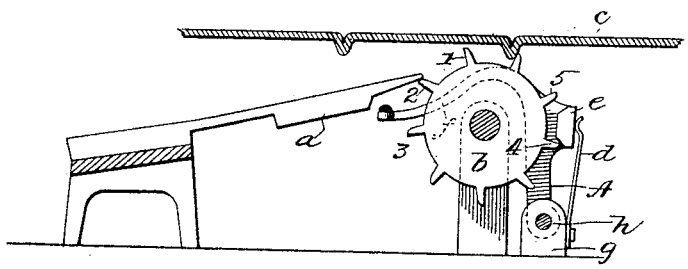
Figure 3:
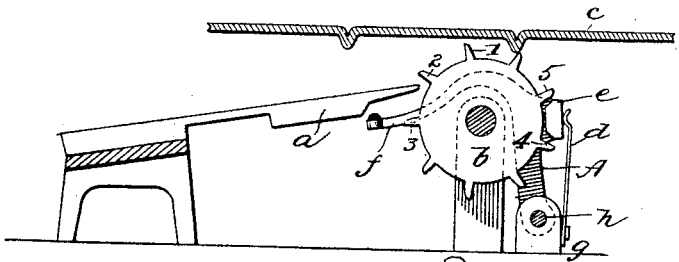
Figure 4:
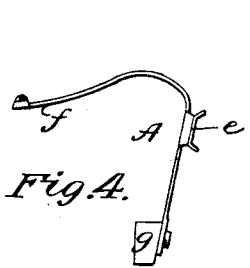
Figure 5:
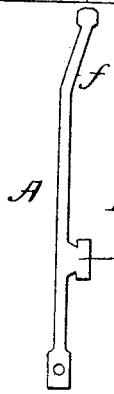

Figure 1 is a side view showing my improved damping device in engagement with the tongue, the tooth 1 of the sprocket wheel having previously vibrated it. Fig. 2 is a side view showing a modification of the damping device and in which the tongue is about to be vibrated by the tooth 2. Fig. 3 is a similar view in which, however, the tooth 2 has vibrated the tongue, this figure indicating the normal position of the parts. Fig. 4 is a detail of the damping device made in accordance with my preferred form. Fig. 5 is a plan view of the blank from which the damper (shown in Fig. 4) is struck up.

My invention relates to an improvement in damping devices and is more particularly adapted to that character of music boxes wherein a note-plate or sheet is used, with an intermediate mechanism for operating the tongues, and said invention consists in the novel arrangement and combination of parts hereinafter described and specifically pointed out in the claims.

In the drawings $a$ represents the musical tongue, which is vibrated by a suitable sprocket wheel $b$. This sprocket wheel $b$ has motion communicated to it through a note plate or disk $c$ or by other suitable means, all of which are arranged as usual in this character of device.

A represents a damper which may be struck up from a single piece of spring metal as shown in Fig. 4 or may be constructed as represented in Figs. 2 and 3, in which case a spring $d$ must be used to hold the damper in contact with the sprocket wheel $b$. This damper is provided with a cam $e$ and with an arm $f$ extending nearly at right angles from the main body portion toward and adapted to reach contact with the tongue $a$. The damper shown in Figs. 1 and 2 is first cut in blanks from spring metal as shown in Fig. 5, and afterward struck up so as to assume a shape similar to that shown in Fig. 4. The damper is then fastened to a suitable support as shown at $g$ so that the cam $e$ on said damper will normally bear against the sprocket wheel $b$, it being understood that each sprocket wheel $b$ or each tongue is provided with a separate damper. When the damper is constructed as shown in Figs. 2 and 3 its supported end is pivoted as shown at $h$ to the support $g$ the spring $d$ operating to hold the cam $e$ against the sprocket wheel $b$. By my invention it will be seen that the strain upon the sprocket wheel is upon opposite sides, that is to say, that the strain of operating the tongues is upon one side of the sprocket wheel while the strain required to operate the damper is upon another, or on the opposite side. It will also be seen that by my invention I am enabled to get a positive pressure of the damper A against the tongue $a$ which is very desirable in this class of instruments.

Having described the details of my invention I will now proceed to describe the operation thereof. The position shown in Fig. 1 is that in which the tooth of the sprocket wheel marked 1 has vibrated the tongue and the tooth 4 has engaged the cam $e$ of the damper forcing it out and consequently the arm $f$ up and in contact with the tongue $a$. In Fig. 2 the tooth 4 of the sprocket wheel $b$ has disengaged itself from the cam $e$ allowing it to spring in between the teeth 4 and 5 on said sprocket-wheel, and the damper to spring out of contact with the tongue $a$ which is then ready to be operated upon by the tooth 2 of the sprocket-wheel and so on each time damping the tongue $a$ before the next succeeding tooth on the sprocket-wheel vibrates it. The normal position of the parts are indicated in Fig. 3, that is to say when the cam $e$ is between and out of contact with two teeth, the damper being off the tongue $a$ and said tongue out of contact with the sprocket-wheel.

Having described my invention, what I claim, and desire to secure by Letters Patent, is—

1. The combination of the sprocket-wheel $b$, tongue $a$ and damper A, said damper having cam *e* located opposite to that side of the sprocket-wheel which is nearest the tongue *a*, and adapted to be operated by said sprocket-wheel to force the damper, by a positive pressure, against the music-tongue, substantially as described.

2. A damper for music boxes struck up from a single piece of spring metal consisting of a main body portion, cam *e* formed on said body portion and arm *f* formed integral therewith and at substantially right angles thereto, as and for the purposes described.

3. The combination of the tongue *a*, sprocket-wheel *b*, means for operating said sprocket-wheel and damper A, said damper having cam *e* and arm *f*, which arm extends at substantially right angles to the body portion of said damper and which latter is adapted to be forced by positive pressure in contact with the vibrating tongue, substantially as described.

GUSTAV A. BRACHHAUSEN.

Witnesses:
HARRY M. TURK,
CHARLES C. SMITH.